US012776182B2

(12) United States Patent
Blayle et al.

(10) Patent No.: US 12,776,182 B2
(45) Date of Patent: Oct. 27, 2026

(54) METERED ICED DISPENSER SYSTEM UTILIZING A BRUSHLESS DIRECT CURRENT GEARMOTOR

(71) Applicant: Follett Products, LLC, Eeaston, PA (US)

(72) Inventors: Paul William Blayle, Allentown, PA (US); Thomas R. Sampson, Nazareth, PA (US); Christopher Ryan Pambianchi, Easton, PA (US)

(73) Assignee: Follett Products, LLC, Eeaston (PA)

(*) Notice: Subject to any disclaimer, the term of this patent is extended or adjusted under 35 U.S.C. 154(b) by 137 days.

(21) Appl. No.: 18/616,991

(22) Filed: Mar. 26, 2024

(65) Prior Publication Data

US 2025/0308318 A1 Oct. 2, 2025

(51) Int. Cl.
*G07F 13/00* (2006.01)
*F25C 5/20* (2018.01)

(52) U.S. Cl.
CPC ................ *G07F 13/00* (2013.01); *F25C 5/20* (2018.01)

(58) Field of Classification Search
CPC . B67D 1/0862; F25C 5/00; F25C 5/12; F25C 5/20; F25C 5/24; G07F 13/00; G07F 13/025; G07F 13/065
USPC .......................................... 222/146.6; 62/344
See application file for complete search history.

(56) References Cited

U.S. PATENT DOCUMENTS 3,059,450 A * 10/1962 Mueller .................... F25C 5/20 62/344
4,228,934 A * 10/1980 Carr .................. B65G 47/1407 366/196
4,496,087 A * 1/1985 Marks ..................... G01F 11/00 222/638
4,676,405 A * 6/1987 Lents ........................ F25C 5/24 222/410
4,901,396 A * 2/1990 Tatematsu ............. E05F 1/1215 267/155
4,921,149 A * 5/1990 Miller ..................... G01F 11/28 222/639
6,039,220 A * 3/2000 Jablonski .............. G01F 13/005 222/413
6,612,733 B2 * 9/2003 Schmidt ................ B01F 27/862 366/310
2003/0197080 A1 * 10/2003 Karkos, Jr. .......... H02K 49/108 241/92
(Continued)

*Primary Examiner* — Charles P. Cheyney
(74) *Attorney, Agent, or Firm* — Crowell & Moring LLP

(57) ABSTRACT

Metered ice dispenser systems utilizing a brushless DC gearmotor are disclosed. In one form, an ice dispenser system includes a brushless DC gearmotor, an ice wheel, a system interface and a processor. The ice wheel is coupled with the brushless DC gearmotor such that rotation of the gearmotor rotates the ice wheel, wherein ice dispenses from the metered ice dispenser system as the ice wheel rotates. The processor is configured to: receive information from the system interface identifying an input, and transmit control information to the brushless DC gearmotor based on the user input. A microcontroller of the brushless DC gearmotor is configured to: start the motor; monitor pulses received from at least one integrated hall sensor indicating a rotation of the motor; and stop the motor after a number of pluses as indicated in the control information is received from the at least one integrated hall sensor.

14 Claims, 8 Drawing Sheets

(56) References Cited

U.S. PATENT DOCUMENTS

| | | | | |
|---|---|---|---|---|
| 2006/0277937 | A1* | 12/2006 | Schlosser | F25C 5/20<br>62/340 |
| 2009/0314796 | A1* | 12/2009 | Graviss | F25C 5/24<br>221/277 |
| 2011/0049190 | A1* | 3/2011 | Sevcik | F25C 5/20<br>222/63 |
| 2024/0351850 | A1* | 10/2024 | Kewalramani | B67D 1/0041 |

* cited by examiner

METERED ICED DISPENSER SYSTEM UTILIZING A BRUSHLESS DIRECT CURRENT GEARMOTOR

BACKGROUND

Beverage production systems, whether automated or hand crafted, regularly use an automated ice dispensing system to fill a receptacle with ice. Current ice dispensing systems often operate by a user pressing and holding a dispense actuation switch/lever for a period of time to cause ice to dispense or operate on a timer after a user actuates a switch/lever. Human reaction time is not reliable in high-speed dispensing applications and timer-based systems do not account for machine-to-machine variations. Moreover, high-accuracy servo motor and encoder systems are often too expensive for food service and vending application. Accordingly, improved ice dispensing systems for use in vending applications are desirable.

SUMMARY

Implementations of ice dispensing systems of the present disclosure provide for the utilization of low-cost brushless direct current ("DC") motors to accurately dispense a pre-defined amount of ice. As described in more detail below, hall effect sensors integrated in brushless DC motors may accurately control a speed and rotation displacement of a brushless DC motor regardless of an influence of speed changes due to uneven loading. As a result, the integrated hall effect sensor may be utilized to accurately control an amount of ice dispensed from the ice dispensing system. The integrated hall effect sensors can also be used for feedback control.

In one form, the present disclosure provides a metered ice dispenser system comprising a brushless direct current (DC) gearmotor, an ice wheel, a system interface, and a processor.

The brushless DC gearmotor includes a motor; at least one integrated hall sensor configured to monitor a rotation of the motor; and a microcontroller in communication with the motor and the at least one integrated hall sensor.

The ice wheel is coupled with the brushless DC gearmotor such that rotation of the motor of the brushless DC gearmotor rotates the ice wheel, wherein ice dispenses from the metered ice dispenser system as the ice wheel rotates.

The system interface is configured to receive an input. The processor is in communication with the brushless DC gearmotor and the system interface. The processor is configured to: receive information from the system interface identifying the input; and transmit control information to the brushless DC gearmotor based on the information received from the system interface.

The microcontroller of the brushless DC gearmotor is configured to receive the control information from the processor, and based on the control information: start the motor; monitor pulses received from the at least one integrated hall sensor indicating a rotation of the motor; and stop the motor after a number of pluses as indicated in the control information is received from the at least one integrated hall sensor.

In another form, the present disclosure provides a method of operating a metered ice dispenser system. In one form of a method, a system interface of the metered ice dispenser receives an input. A processor of the metered ice dispenser receives information from the user interface identifying the user input and transmits control information to a microcontroller of a brushless DC gearmotor of the metered ice dispenser system, where the control information is based on the information received from the system interface.

The microcontroller receives the control information the processor, and based on the control information, the microcontroller: starts a motor of the brushless DC gearmotor, wherein the motor is coupled with an ice wheel of the metered ice dispenser and rotates the ice wheel during movement, and wherein ice dispenses from the metered ice dispenser system as the ice wheel rotates; monitors pulses received from at least one integrated hall sensor of the brushless DC gearmotor, the pulses from the at least one integrated hall sensor indicating a rotation of the motor; and stops the motor after a number of pulses as indicated in the control information is received from the at least one integrated hall sensor.

In yet another form, the present disclosure provides a metered ice dispenser system including a brushless DC gearmotor, an ice wheel, a system interface, and a processor.

The brushless DC gearmotor comprises a motor and at least one integrated hall sensor configured to monitor a rotation of the motor. The ice wheel is coupled with the brushless DC gearmotor such that rotation of the motor of the brushless DC gearmotor rotates the ice wheel, wherein ice dispenses from the metered ice dispenser system as the ice wheel rotates. The system interface is configured to receive an input.

The processor is in communication with the brushless DC gearmotor and the system interface. The processor is configured to: receive information from the system interface identifying the input; determine control information for the brushless DC gearmotor based on the information received from the system interface; start the motor; monitor pulses received from the at least one integrated hall sensor indicating a rotation of the motor; and stop the motor after a number of pluses as indicated in the control information is received from the at least one integrated hall sensor.

DETAILED DESCRIPTION

The present disclosure is directed to an ice dispensing system that utilizes hall sensors within a brushless DC motor to accurately control an amount of ice dispensed during operation.

Figure 1:
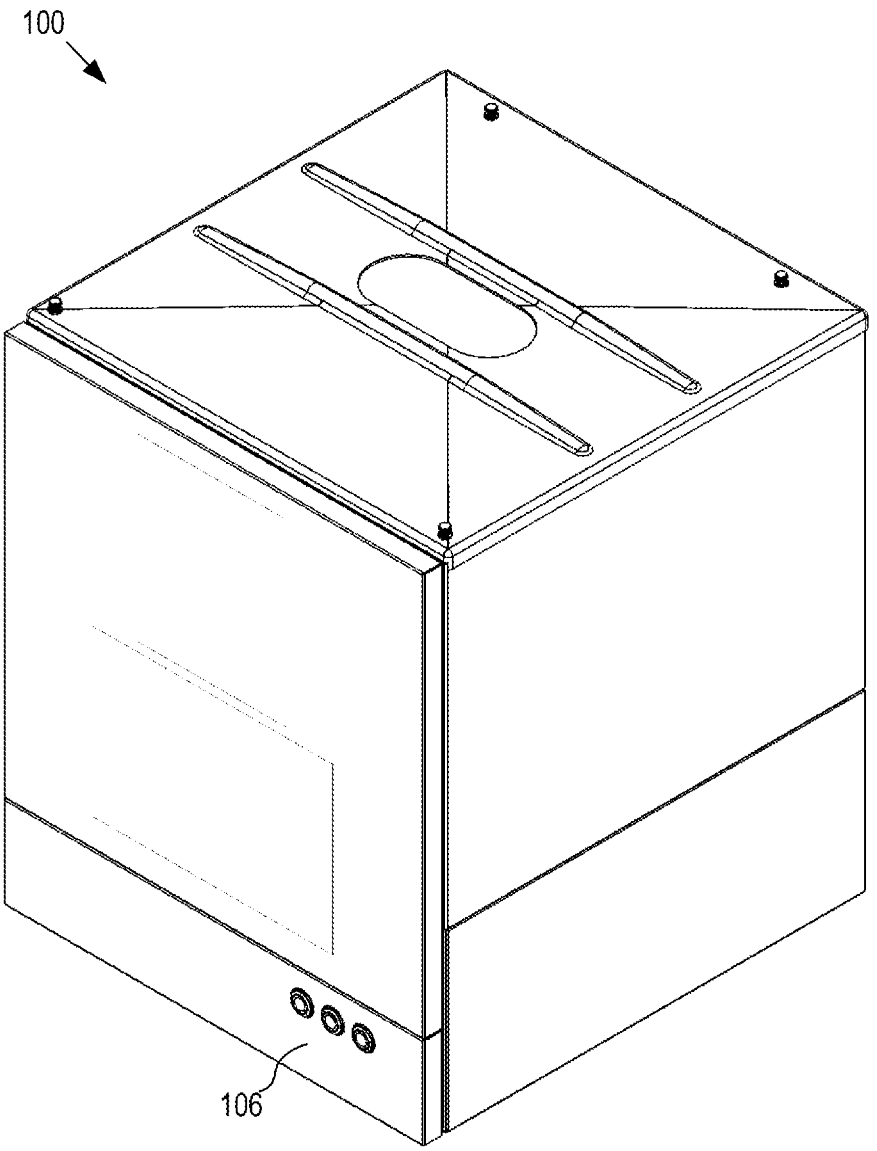
FIG. 1 is a perspective view of one form of an ice dispensing system.
Figure 2:
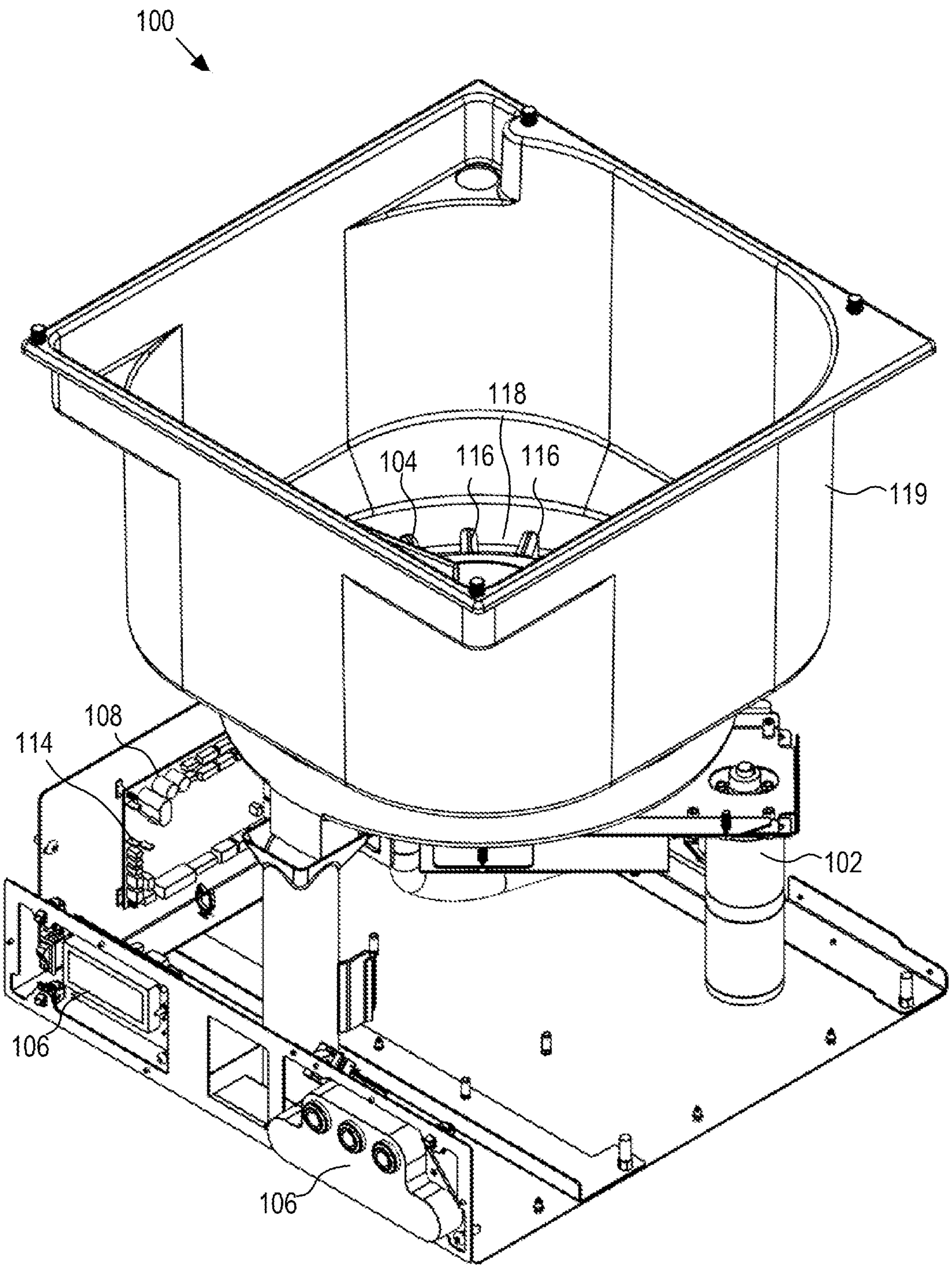
FIG. 2 is a perspective view of internal components of one form of an ice dispensing system.
Figure 3:
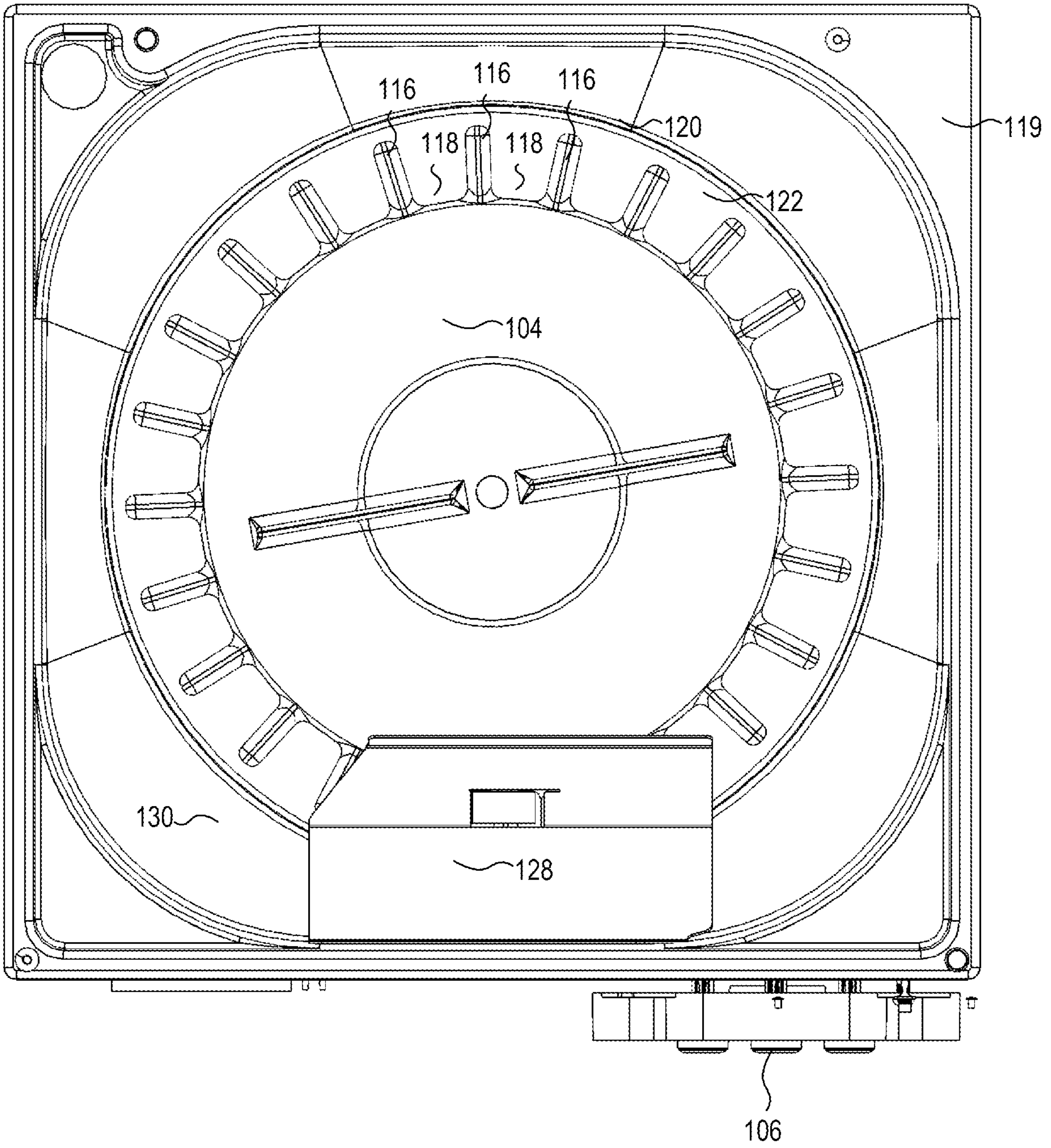
FIG. 3 is a top view of interior components of one form of an ice dispensing system.
Figure 4:
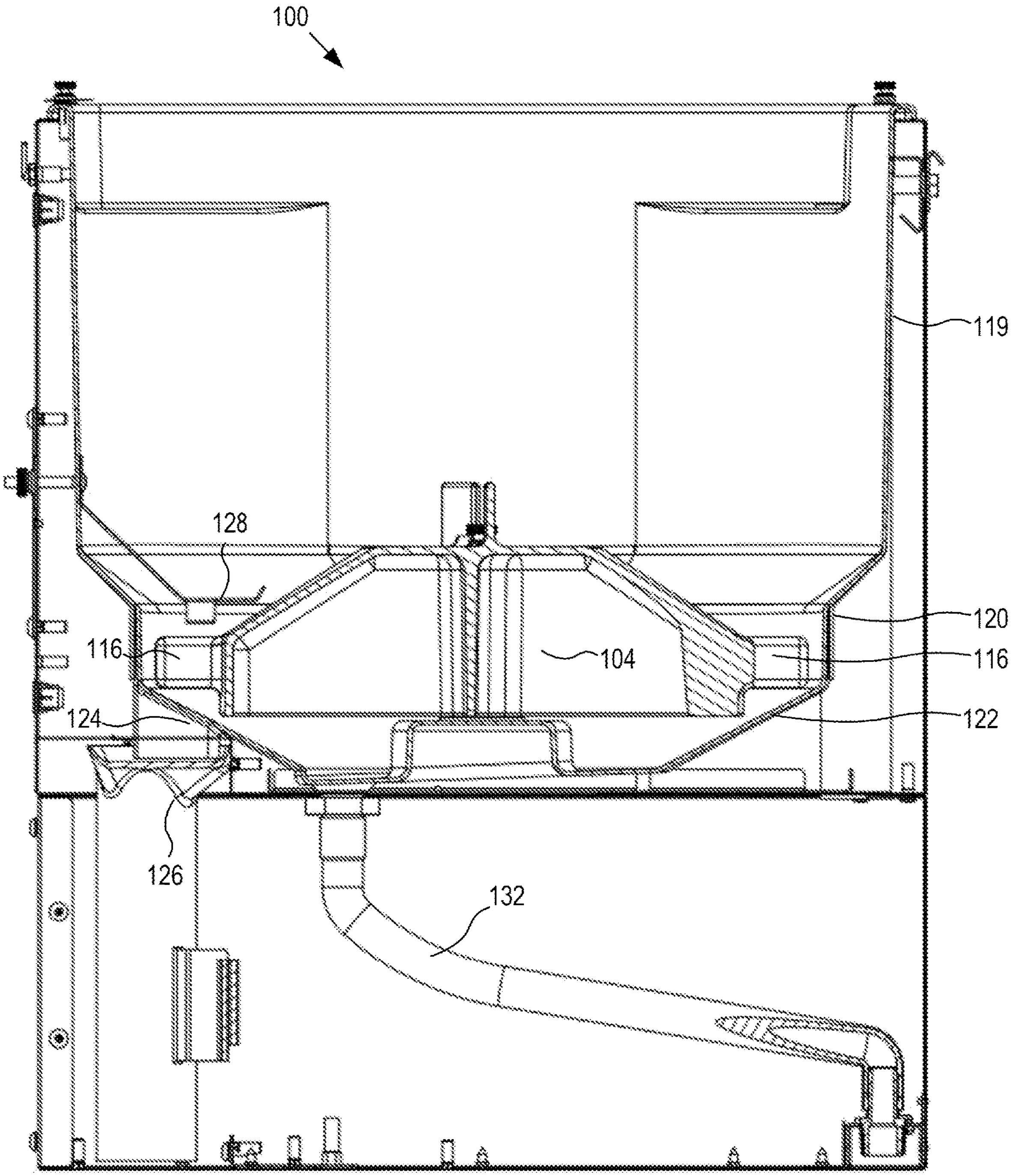
FIG. 4 is a cross-sectional side view of interior components of one form of an ice dispensing system.
Figure 5:
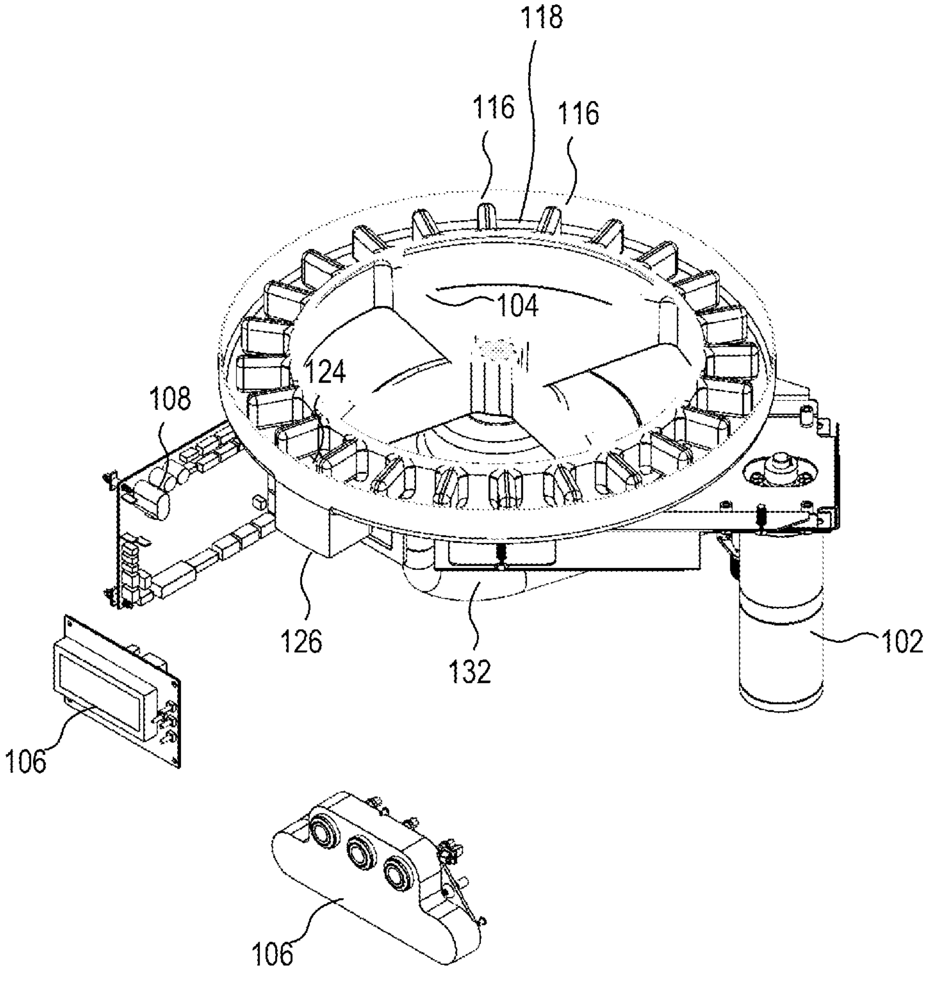
FIG. 5 is a cross-sectional perspective view of internal components of one form of an ice dispensing system.

FIG. 1 is a perspective view of one form of an ice dispensing system 100; FIG. 2 is a perspective view of internal components of one form of an ice dispensing system; FIG. 3 is a top view of interior components of one form of an ice dispensing system 100; and FIG. 4 is a cross-sectional side view of interior components of one form of an ice dispensing system 100.

Referring to FIGS. 2-5, an ice dispensing system 100 may include a brushless DC gearmotor 102, an ice wheel 104, a system interface 106 and a processor 108.

The brushless DC gearmotor 102 generally includes a motor, a gear motor assembly, at least one integrated hall sensor, and a microcontroller 114 in communication with the motor, the at least one integrated hall sensor, and the processor 108. In some implementations, the microcontroller 114 may be positioned on the same integrated circuit as the processor 108. However, in other implementations, the microcontroller 114 may positioned on an integrated circuit that is distinct from the integrated circuit including the processor 108. During operation, the microcontroller 114 provides power to the motor, which cause the motor to rotate. As the motor rotates, the integrated hall sensors detect rotation of the motor and send pulses to the microcontroller 114 identifying rotation of the motor.

As known in art, hall sensors generally operate through the use of magnets positioned on a rotating shaft of the motor. A hall element transducer is positioned at a side of the rotating shaft and a DC bias current is applied along an axis of the hall element transducer. As the shaft rotates and the magnets positioned on the rotating shaft rotate towards and then away from the hall element transducer, the magnetic fields of the magnets disrupt the DC bias current across the hall element transducer and cause voltage peaks. The microcontroller 114 detects these voltage peaks as pulses that represent one rotation of the motor, or a fraction of a rotation of the motor, depending on the positioning of the magnets of the hall sensor on the rotating shaft of the motor. Once the microcontroller 114 receives a determined number of pulses from the at least one hall sensors, the microcontroller 114 interrupts and stops power to the motor, thereby causing the motor to stop rotating.

In the ice dispenser system 100, the ice wheel 104 is coupled with the brushless DC gearmotor 102 such that as the motor of the brushless DC gearmotor 102 rotates, the ice wheel 104 also rotates. In the implementations described here, the ice wheel 104 is configured to rotate in a counter-clockwise direction. However, in other implementations, the ice wheel 104 may be configured to rotate in a clockwise direction. As discussed herein, rotation of the ice wheel 104 causes ice to dispense from the ice dispensing system 100. By using the integrated hall sensors 112 within the brushless DC gearmotor 102 to control how much the motor rotates, thereby controlling how much the ice wheel 104 rotates, the ice dispensing system 100 is able to accurately control an amount of ice dispensed during operation.

As show in FIG. 3, in some implementations the ice wheel 104 defines a plurality of paddles 116 positioned around the ice wheel 104. The plurality of paddles 116 are configured to retain an amount of ice between two adjacent paddles as the ice wheel rotates 104. In some implementation, a pocket 118 for ice is defined by at least two adjacent paddles of the plurality of paddles 116, an ice bin 119 side wall 120, and an ice bin 119 bottom wall 122.

As the ice wheel 104 rotates, one or more pockets 118 retaining ice rotate over an aperture 124 in the ice bin 119 bottom wall 122 where ice in the pocket 118 may flow into a dispense chute 126. Ice may then flow through the dispense chute 126 and into a receptacle positioned below the ice dispensing system.

Figure 6:
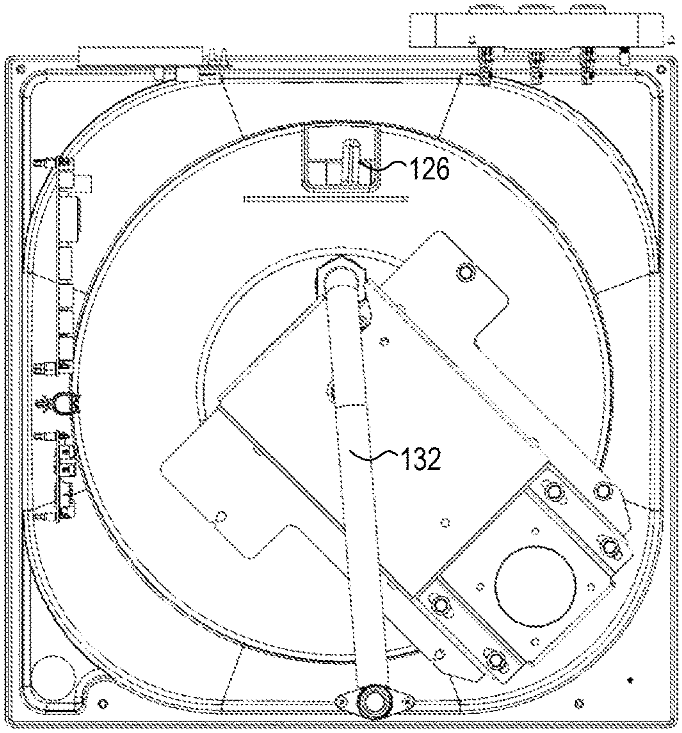
FIG. 6 is a bottom view of one form of interior components of an ice dispensing system.
Figure 7:
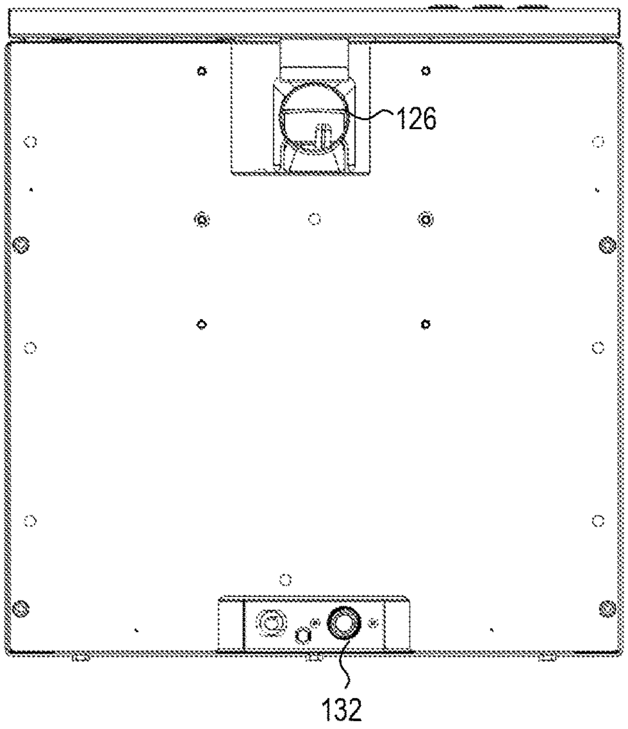
FIG. 7 is a bottom view of one form of a bottom of an ice dispensing system.

FIG. 6 is a bottom view of one form of interior components of an ice dispensing system 100 and FIG. 7 is a bottom view of one form of a bottom of an ice dispensing system, both illustrating one end of the dispense chute 126 that a receptacle may be positioned under to receive ice from the ice dispensing system 100 as the ice wheel 104 rotates.

Referring again to FIGS. 2-5, in some implementations, the ice dispensing system 100 may include a baffle 128 positioned above at least a portion of the aperture 124 such that as the ice wheel 104 rotates, the baffle 128 levels ice within a pocket 118 before that pocket 118 is positioned over the aperture 124. It will be appreciated that leveling the ice within the pocket 118 serves to ensure a consistent amount of ice is positioned in each pocket 118 before the ice is dispensed through the aperture 124 and dispense chute 126, as well as help ensure that all of the ice is dispensed from a pocket 118 when it is positioned above the aperture 124.

In some implementations, the baffle 128 additionally helps to pile ice in an area of the ice bin 130 before a pocket 118 rotates under the baffle and before the pocket 118 rotates above the aperture 124. Piling ice in this area of the bin 130 assists in filling each of the pockets 118 with ice.

In some implementations, the ice dispensing system 100 may also include a drain tube 132 in communication with the ice bin 119 bottom wall 122 that provides a path for water from melted ice to exit the ice dispensing system 100.

Figure 8:
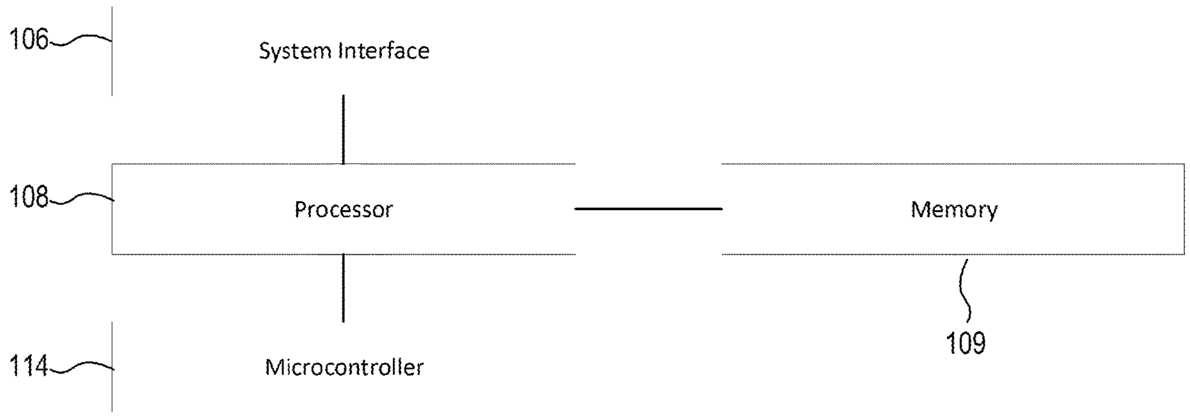
FIG. 8 is a block diagram of interior components of an ice dispensing system.

As shown in FIG. 8, the system interface 106 is electronically connected to the processor 108. In some implementations, the system interface 106 comprises a user interface that may include one or more physical buttons, a touch-screen, and/or a display that allows a user to interact with the user interface 106 and select one of multiple preset sizes for ice dispensing. For example, in one implementation, a user is able to make a selection of dispensing ice for a small, medium, or large size beverage.

Further, in some implementations, the system interface 106 may comprise a program interface that is configured to communicate with other beverage systems. For example, in implementations where the ice dispensing system 100 is integrated within a larger beverage machine, the beverage machine may receive an order for a specific beverage such as a large cola. As part of preparing the large cola, the beverage machine rather than a user may send instructions via the system interface 106 to the ice dispensing system 100 to dispense ice for a large beverage.

When an input is provided to the system interface 106 whether by, for example, a user interacting with a user interface or another system providing instructions to the ice dispensing system 100, information indicating the input provided at the system interface 106 is communicated to the processor 108. The processor 108 receives the information from the system interface 106 and determines control information for the brushless DC gearmotor 102 that will cause the ice dispenser system 100 to dispense an amount of ice that corresponds to the input received at the system interface 106. In some implementations, the processor 108 may determine the control information from a lookup table or other data structure stored in a memory 109.

In some implementations, the control information for the brushless DC gearmotor 102 may be a data string that comprises a speed, a direction, and/or a number of pulses to rotate the brushless DC gearmotor 102. In one illustrative example, the control information may be:

01 06 00 0C 02 06 C8 FB where "01" is a host address, "06" is a function code, "00 0C" is a register address, "02 C6" is data to write (number of pulses to rotate the motor) and "C8 FB" is a CRC. While the example above includes a number of pulses to rotate the brushless DC gearmotor 102, similarly formatted control information may be utilized for speed and direction using different fields such as different register addresses, data to write, and/or CRC.

The processor 108 communicates the control information to the microcontroller 114, which operates the brushless DC gearmotor 102 as described above to dispense the desired amount of ice from the ice dispenser system.

It will be appreciated that while in some implementations, the ice dispensing system may include both a processor 108 and a distinct microcontroller 114 for the brushless DC motor 102, in other implementations, the processor 108 may additionally perform the operations of the microcontroller 114 described above.

Figure 9:
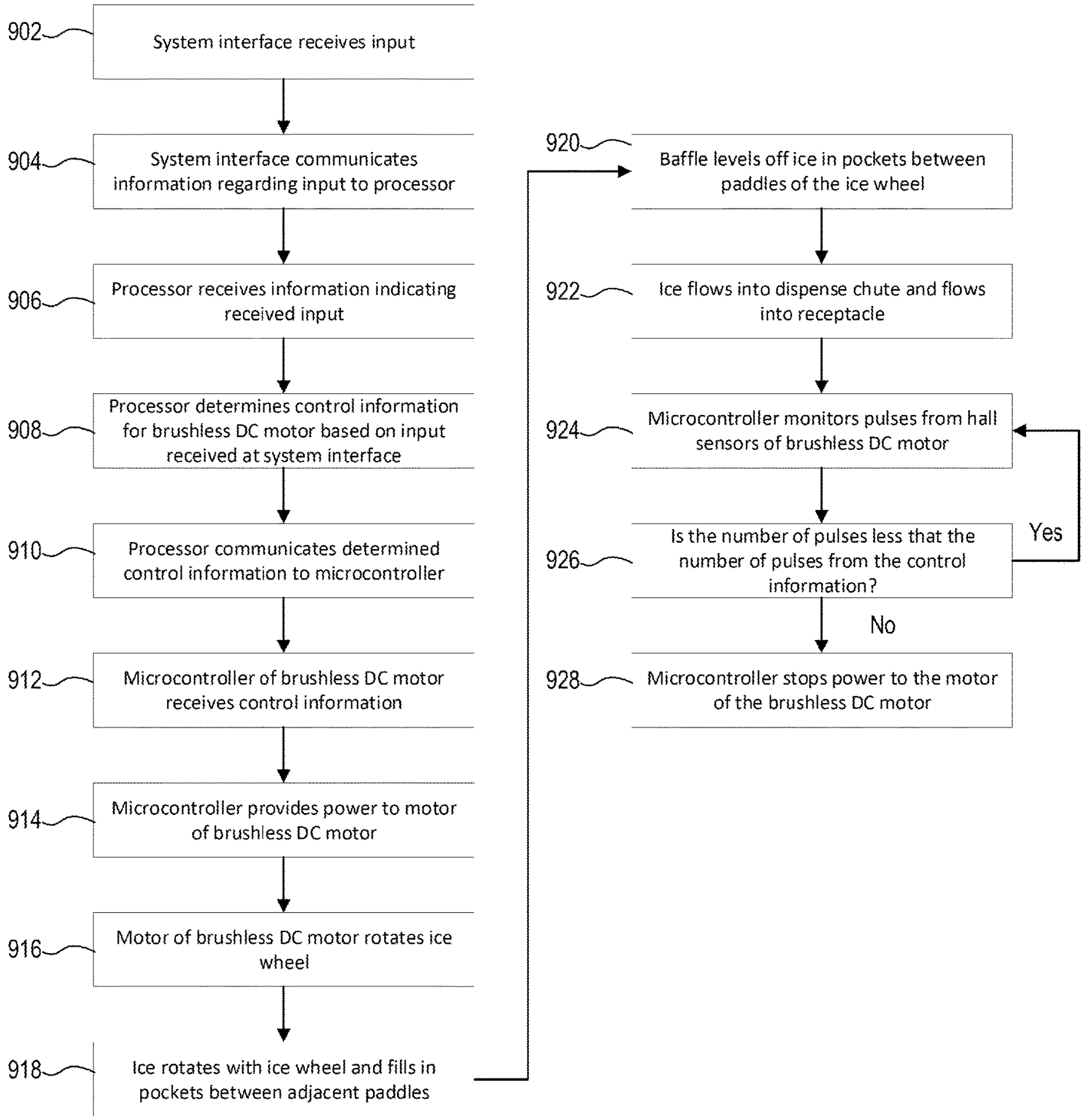
FIG. 9 is a flow chart of one form of a method for operating an ice dispensing system utilizing a brushless DC motor.

FIG. 9 is a flow chart of one form of a method for operating an ice dispensing system utilizing a brushless DC motor, such as the implementations of an ice dispensing system described above in connection with FIGS. 1-8.

At step 902 an input is received at the system interface. As discussed above, in some implementations this may include a user interacting with a user interface of an ice dispensing system and selecting a desired beverage size or another system sending an input to the ice dispensing system via the system interface.

At step 904, the system interface communicates information indicating the received input to a processor of the ice dispensing system. At step 906, the processor receives the information indicating the input received at the system interface, and step 908, the processor determines control information for the DC brushless motor based on the received information. In some implementations, the processor may determine the control information by accessing a lookup table or other data structure stored in a memory.

As discussed above, in some implementations, the control information is a data string comprising at least one of a speed, a direction, or a number of pulses to rotate a motor of the brushless DC motor.

At step 910, the processor transmits the control information to a microcontroller of the brushless DC motor.

At step 912, the microcontroller receives the control information. At step 914, the microcontroller provides power to the motor, thereby causing the motor to rotate. At step 916, the motor rotates the ice wheel coupled to the brushless DC gearmotor.

At step 918, ice positioned between adjacent paddles positioned around the ice wheel rotate with rotation of the ice wheel and ice fills into the pockets between adjacent paddles.

At step 920, as the ice wheel rotates, the baffle levels ice within the pockets and pushes excess ice into an area of the ice bin before a pocket rotates under the baffle to assist in filling the pockets between adjacent paddles of the ice wheel with ice.

At step 922, as the ice wheel rotates, and one or more pockets between adjacent paddles rotate over the aperture in the bottom of the ice bin, ice flows from the pocket, through the aperture, and into the dispense chute. The ice then flows out of the dispense chute and into a receptacle positioned below the dispense chute.

As the motor rotates at step 916 and steps 918, 920, and 922 occur, at step 924, the microcontroller monitors pulses received from at least one integrated hall sensor of the brushless DC gearmotor indicating rotation of the motor.

As the microcontroller monitors the received pulses, at step 926 the microcontroller determines whether a number of received pulses from the at least one integrated hall sensor is less than the number of pulses indicated in the received control information.

When the microcontroller determines that the number of received pulses is less than the number of pulses indicated in the received control information, the microcontroller does not interrupt power to the motor and continues to monitor the number of pulses received from the at least one integrated hall sensor.

However, when the microcontroller determines at step 926 that the number of received pulses from the at least one integrated hall sensor is equal to the number of pulses indicated in the received control system, at step 928, the microcontroller interrupts and stops power to the brushless DC gearmotor, thereby stopping rotation of the motor and stopping ice from further dispensing from the ice dispensing system.

Although certain embodiments and implementations of the disclosure have been specifically described herein, it will be apparent to those skilled in the art to which the disclosure pertains that variations and modifications of the various embodiments shown and described herein may be made without departing from the spirit and scope of the disclosure. Accordingly, it is intended that the disclosure be limited only to the extent required by the appended claims and the applicable rules of law.

The invention claimed is:

1. A metered ice dispenser system comprising:

a brushless direct current (DC) gearmotor comprising:

a motor;

at least one integrated hall sensor configured to monitor a rotation of the motor; and a microcontroller in communication with the motor and the at least one integrated hall sensor;

an ice wheel coupled with the brushless DC gearmotor such that rotation of the motor of the brushless DC gearmotor rotates the ice wheel, wherein ice dispenses from the metered ice dispenser system as the ice wheel rotates;

a system interface configured to receive an input;

a processor in communication with the brushless DC gearmotor and the system interface, the processor configured to:

receive information from the system interface identifying the input; and transmit control information to the brushless DC gearmotor based on the information received from the system interface;

wherein the microcontroller of the brushless DC gearmotor is configured to receive the control information from the processor, and based on the control information:

start the motor;

count a number of pulses received from the at least one integrated hall sensor, where each pulse is configured to indicate a defined angular rotation of the motor and the ice wheel, thereby indicating a defined amount of ice dispensed at each pulse; and stop the motor after the number of counted pulses is equal to a number of pluses as indicated in the control information;

wherein the ice wheel defines a plurality of paddles configured to retain the defined amount of ice between adjacent paddles of the plurality of paddles as the ice wheel rotates; and wherein the metered ice dispenser further comprises a dispense chute configured to allow ice from between adjacent paddles of the plurality paddles of the ice wheel to flow into the dispense chute and out of the dispense chute and into a receptacle.

2. The metered ice dispenser of claim 1, wherein the control information comprises a speed, a direction, and a number of pulses to rotate the motor.

3. The metered ice dispenser of claim 2, wherein the control information is a data string.

4. The metered ice dispenser of claim 1, wherein:

to start the motor, the microcontroller is configured to provide power to the motor; and stop the motor, the microcontroller is configured to cease power to the motor.

5. The metered ice dispenser of claim 1, further comprising:

a baffle over the ice wheel above the dispense chute, wherein the baffle is configured to level a top of ice between adjacent paddles of the plurality of paddles of the ice wheel that are positioned above the dispense chute.

6. The metered ice dispenser of claim 1, wherein:

the system interface is a user interface; and the user interface comprises at least one of a touchscreen or a plurality of buttons, where at least two of the plurality of buttons correspond to different amounts of ice to dispense.

7. The metered ice dispenser of claim 1, wherein:

the system interface is configured to receive the input from another system of a beverage system.

8. A method of operating a metered ice dispenser system, the method comprising:

receiving, at a system interface of the metered ice dispenser, an input;

receiving, with a processer of the metered ice dispenser, information from the system interface identifying the input;

transmitting, with the processor, control information to a microcontroller of a brushless DC gearmotor of the metered ice dispenser, where the control information that is based on the information received from the system interface;

receiving, at the microcontroller, the control information from the processor, and based on the control information, the microcontroller:

starting a motor of the brushless DC gearmotor, wherein the motor is coupled with an ice wheel of the metered ice dispenser and rotates the ice wheel during movement, and wherein ice dispenses from the metered ice dispenser system as the ice wheel rotates;

counting a number of pulses received from at least one integrated hall sensor of the brushless DC gearmotor, where each pulse is configured to indicate a defined angular rotation of the motor and the ice wheel, thereby indicating a defined amount of ice dispensed at each pulse; and stopping the motor after the number of counted pulses is equal to a number of pulses as indicated in the control information;

wherein the ice wheel defines a plurality of paddles configured to retain the defined amount of ice between adjacent paddles of the plurality of paddles as the ice wheel rotates; and wherein the metered ice dispenser comprises a dispense chute configured to allow ice from between adjacent paddles of the plurality paddles of the ice wheel to flow into the dispense chute and out of the dispense chute and into a receptacle.

9. The method of claim 8, wherein the control information comprises a speed, a direction, and a number of pulses to rotate the motor.

10. The method of claim 9, wherein the control information is a data string.

11. The method of claim 8, wherein starting the motor comprises providing power to the motor; and stopping the motor comprises ceasing power to the motor.

12. The method of claim 8, wherein:

the system interface is a user interface; and the user interface comprises at least one of a touchscreen or a plurality of buttons, where at least two of the plurality of buttons correspond to different amounts of ice to dispense.

13. The method of claim 8, wherein:

the system interface is configured to receive the input from another system of a beverage system.

14. A metered ice dispenser system comprising:

a brushless direct current (DC) gearmotor comprising:

a motor; and at least one integrated hall sensor configured to monitor a rotation of the motor;

an ice wheel coupled with the brushless DC gearmotor such that rotation of the motor of the brushless DC gearmotor rotates the ice wheel, wherein ice dispenses from the metered ice dispenser system as the ice wheel rotates;

a system interface configured to receive an input;

a processor in communication with the brushless DC gearmotor and the system interface, the processor configured to:

receive information from the system interface identifying an input;

determine control information for the brushless DC gearmotor based on the information from the system interface;

start the motor;

count a number of pulses received from the at least one integrated hall sensor, where each pulse is configured to indicate a defined angular rotation of the motor and the ice wheel, thereby indicating a defined amount of ice dispensed at each pulse; and stop the motor after a number of counted pulses is equal to a number of pluses as indicated in the control information;

wherein the ice wheel defines a plurality of paddles configured to retain the defined amount of ice between adjacent paddles of the plurality of paddles as the ice wheel rotates; and wherein the metered ice dispenser further comprises a dispense chute configured to allow ice from between adjacent paddles of the plurality paddles of the ice wheel to flow into the dispense chute and out of the dispense chute and into a receptacle.

* * * * *